(12) United States Patent
Morris

(10) Patent No.: US 7,384,232 B2
(45) Date of Patent: Jun. 10, 2008

(54) SECURING ASSEMBLY FOR A PASSENGER LIFT

(75) Inventor: Don Morris, Conifer, CO (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 89 days.

(21) Appl. No.: 10/431,238

(22) Filed: May 6, 2003

(65) Prior Publication Data
US 2004/0094365 A1    May 20, 2004

Related U.S. Application Data

(60) Provisional application No. 60/421,018, filed on Oct. 23, 2002.

(51) Int. Cl.
*B60P 1/44*    (2006.01)
(52) U.S. Cl. ...................................... 414/545; 414/921
(58) Field of Classification Search ................ 414/538, 414/469, 471, 545, 921; 187/9 E, 9 R; 59/88; 24/116 R
See application file for complete search history.

(56) References Cited

U.S. PATENT DOCUMENTS

| | | | | | |
|---|---|---|---|---|---|
| 2,652,018 | A | * | 9/1953 | Griffith | ...................... 114/180 |
| 3,652,116 | A | * | 3/1972 | Pruitt | ...................... 294/82.11 |
| 3,710,962 | A | * | 1/1973 | Fowler, Jr. | .................. 414/545 |
| 4,159,849 | A | * | 7/1979 | Rehbein | .................. 299/34.09 |
| 4,312,426 | A | * | 1/1982 | McVeen | ...................... 187/229 |
| 4,526,251 | A | * | 7/1985 | Johannson | .................. 187/229 |
| 4,531,615 | A | * | 7/1985 | Wible | .......................... 187/227 |
| 4,534,588 | A | * | 8/1985 | Markey | ...................... 294/81.5 |
| 4,909,358 | A | * | 3/1990 | Jansen et al. | ............... 187/255 |
| 5,566,999 | A | * | 10/1996 | Goettl | .......................... 84/298 |
| 6,478,111 | B2 | * | 11/2002 | Olson et al. | .................... 182/3 |

\* cited by examiner

*Primary Examiner*—Charles A Fox
(74) *Attorney, Agent, or Firm*—Christensen O'Connor Johnson Kindness PLLC

(57) ABSTRACT

A wheelchair lift (10) for a vehicle is disclosed. The wheelchair lift includes a lift platform assembly (13) coupled to a frame (18). The wheelchair lift also includes a reciprocating assembly (12) in communication with the lift platform to reciprocate the lift platform between a raised position and a lowered position. A locking mechanism (47) is coupled to the frame and lockingly engages a portion of the reciprocating assembly (34) to maintain communication between the reciprocating assembly and the lift platform if a portion of the reciprocating assembly fails.

13 Claims, 5 Drawing Sheets

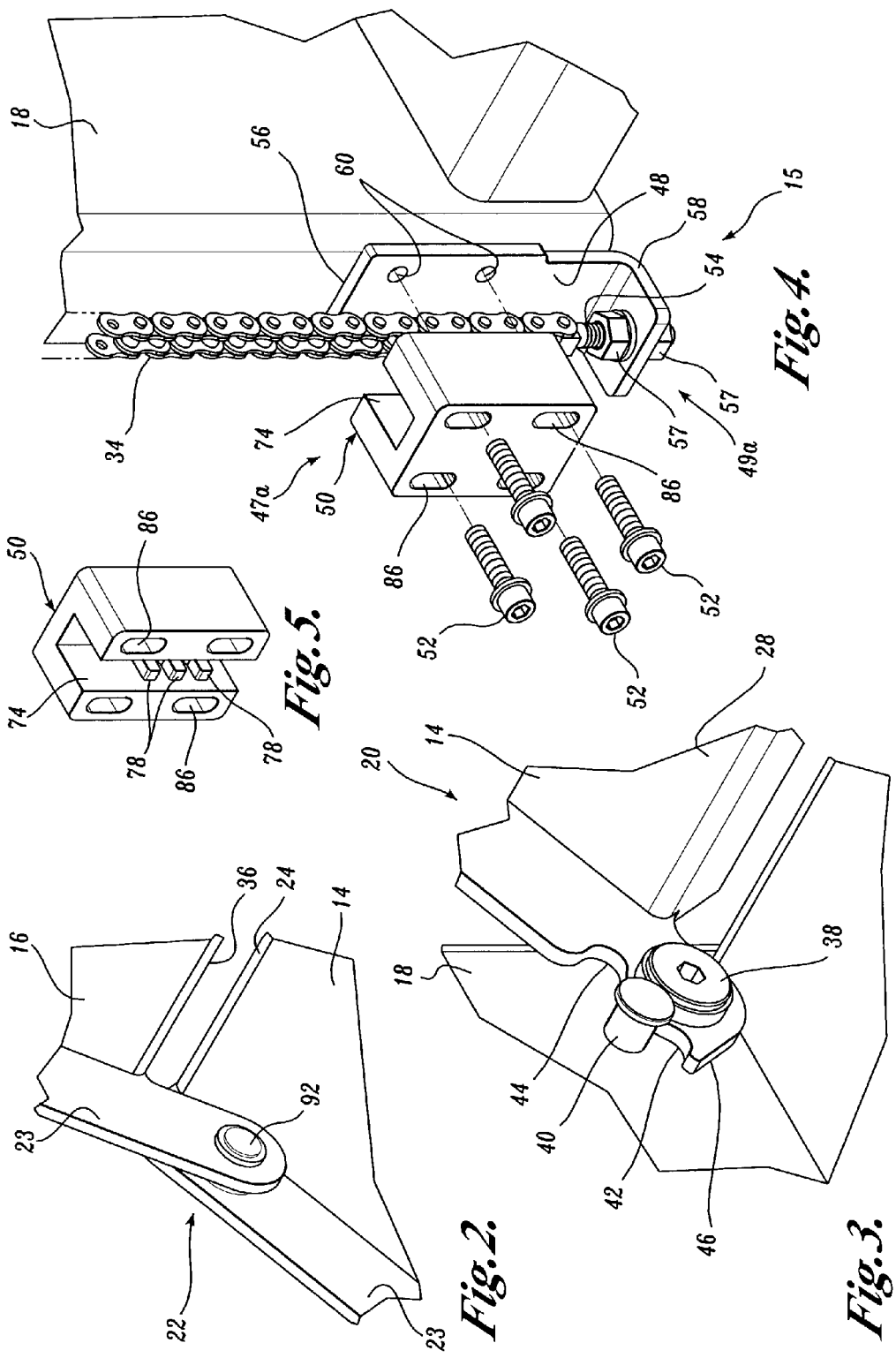

SECURING ASSEMBLY FOR A PASSENGER LIFT

CROSS-REFERENCE TO RELATED APPLICATION

This application claims the benefit of U.S. Provisional Patent Application Ser. No. 60/421,018, filed on Oct. 23, 2002, the disclosure of which is hereby expressly incorporated by reference, and priority from the filing date of which is hereby claimed under 35 U.S.C. § 119(e).

FIELD OF THE INVENTION

The present invention relates generally to lifts for mobility impaired persons, and more particularly, to a securing assembly for redundantly securing a reciprocating assembly to a lift platform, the reciprocating assembly adapted to reciprocate the lift platform between a raised and a lowered position.

BACKGROUND OF THE INVENTION

The Americans with Disabilities Act (ADA) requires the removal of physical obstacles to those who are physically challenged. Included within the scope of the ADA are motor vehicles, such as trains and buses. Specifically, new, used, or remanufactured buses sold are required to comply with the applicable provisions of the statute. One such provision requires that deployed lift platforms, when occupied, shall have devices for preventing the lift platform from dropping an occupant in the event of a single failure of any load-carrying component. Therefore, to comply with the ADA, redundant support systems need to be included on passenger lifts.

Currently, there are a wide variety of passenger lifts available for motor vehicles. One such lift is adapted to be mounted within an entryway of a motor vehicle. Such a lift includes a vertical reciprocating lift platform assembly mounted within the vehicle, the lift platform selectively actuatable between at least a raised and a lowered position. The lift platform assembly consists of an inboard platform and an outboard platform. The outboard platform is hingedly attached to the outboard edge of the inboard platform by two sets of horizontally oriented pin assemblies. The pin assemblies are located on opposite sides of the lift platform assembly. The inboard edge of the inboard platform is hingedly attached to two vertical support members located in the entrance of the passenger vehicle by a second set of two horizontally oriented pin assemblies. The vertical members can be selectively raised and lowered to convey the attached lift platform assembly between the raised and lowered positions.

The pin assemblies allow the lift platform assembly to be rotatably transfigured from a stowed position to an extended position. In the extended position, the upper planar surface of the inboard platform is oriented parallel with and above the ground. The outboard platform is rotated on the pin assemblies outward from the inboard platform until the upper planar surface of the outboard platform is coplanar with the inboard platform. Once in the extended position as described, the lift platform assembly is lowered to the ground or sidewalk so that a mobility impaired individual may board the lift platform assembly. Two drive chains, one attached to the left vertical member, the other attached to the right vertical member, of a reciprocating assembly are actuated to raise the vertical support members and the attached lift platform assembly. Once in the raised position, the lift platform assembly is level with the floor of the motor vehicle. The mobility impaired person is then free to deboard the lift platform assembly into the passenger compartment of the vehicle.

The lift platform assembly is then rotatably transfigured into the stowed position. This is done by rotating the folding platform until the upper surface of the folding platform is parallel with and opposing the upper surface of the inboard platform. The inboard platform and outboard platform are further rotated as a unit into a vertical stowed position, nested between and parallel with the vertical support members. Although such a lift is effective at providing mobility impaired persons, such as those in a wheelchair, access into and out of a motor vehicle, it is not without its problems.

For instance, the drive chains of the reciprocating assembly are coupled to the frame of the lift platform by a single securing device. More specifically, in the above-described lift, each of the drive chains is attached to one of the vertical support members by a clevis. The devises are then adjustably attached to mounting brackets on the vertical support members. The devises have a threaded portion that mates with the mounting bracket through a set of adjusting nuts. By selectively engaging the adjusting nuts associated with either the left or right drive chain, a user can level the lift platform assembly. Although the described apparatus of attaching the drive chains to the vertical support members is advantageous since it allows the leveling of the lift platform assembly, it is not without problems. Specifically, if a catastrophic failure occurs in the clevis, or the lower portion of the mounting bracket, or if the threads of a clevis disengage from the mounting bracket adjusting nuts, or other such failure, the lift platform assembly could canter to one side, or drop, injuring the lift user or others in proximity to the lift.

Such a passenger lift is not only dangerous, it also fails to comply with the ADA regarding single point failure of any load carrying component. Further, such passenger lifts are also not in compliance with proposed rules recently submitted to the Department of Transportation (DOT) by the National Highway Traffic Safety Administration (NHTSA) for possible inclusion in the Federal Motor Vehicle Safety Standards (FMVSS) that if enacted, will establish even more stringent requirements with at least regard to the single point of failure provision.

For at least the foregoing reasons, there exists a need for a passenger lift that includes a redundant support in the event of a failure of a portion of the lift, wherein the redundant support complies with the ADA requirements and the proposed FMVSS changes, is economical to install and maintain, and may be easily retrofitted into existing passenger lifts.

SUMMARY OF THE INVENTION

A passenger lift formed in accordance with one embodiment of the present invention is provided. The passenger lift is adapted to convey a passenger between a first elevation and a second elevation and includes a lift platform coupled to a frame. The passenger lift also includes a reciprocating assembly in communication with the lift platform to reciprocate the lift platform between a raised position and a lowered position. A locking mechanism is coupled to the frame and lockingly engages a portion of the reciprocating assembly to maintain communication between the reciprocating assembly and the lift platform if a portion of the reciprocating assembly fails.

A passenger lift formed in accordance with another embodiment of the present invention is provided. The passenger lift is adapted to convey a passenger between a first elevation and a second elevation and includes a lift platform coupled to a frame. The passenger lift also includes a reciprocating assembly in communication with the lift platform to reciprocate the lift platform between a raised and a lowered position. A locking mechanism couples the reciprocating assembly to the frame. An attachment assembly also couples the reciprocating assembly to the frame. If either the locking mechanism or the attachment assembly fails, the other of the locking mechanism or the attachment assembly provides a continued connection of the reciprocating assembly to the frame.

A passenger lift formed in accordance with still another embodiment of the present invention is provided. The passenger lift is adapted to convey a passenger between a first elevation and a second elevation and includes a lift platform coupled to a frame. The passenger lift also includes a reciprocating assembly in communication with the lift platform to reciprocate the lift platform between a raised position and a lowered position. The passenger lift further includes a means for lockingly coupling a portion of the reciprocating assembly to the frame. The means for lockingly coupling includes a first coupling means for coupling the reciprocating assembly in communication with the lift platform. The means for lockingly coupling also includes a second coupling means for coupling the reciprocating assembly in communication with the lift platform. The first and second coupling means provide redundant coupling of the reciprocating assembly to the frame.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 2 is a perspective detail view of a pin assembly shown in FIG. 1 coupling an inboard platform to an outboard platform of the passenger lift;

FIG. 3 is a perspective detail view of a pin assembly shown in FIG. 1 coupling the inboard platform to a vertical support member;

FIG. 4 is a partially exploded perspective detail view of the securing assembly shown in FIG. 1, illustrating the redundant securing mechanisms including a chain clevis and a chain lock block for securing the reciprocating assembly to the frame of the passenger lift;

FIG. 5 is a rear perspective view of the chain lock block of FIG. 4;

DETAILED DESCRIPTION OF THE PREFERRED EMBODIMENT

Figure 1:
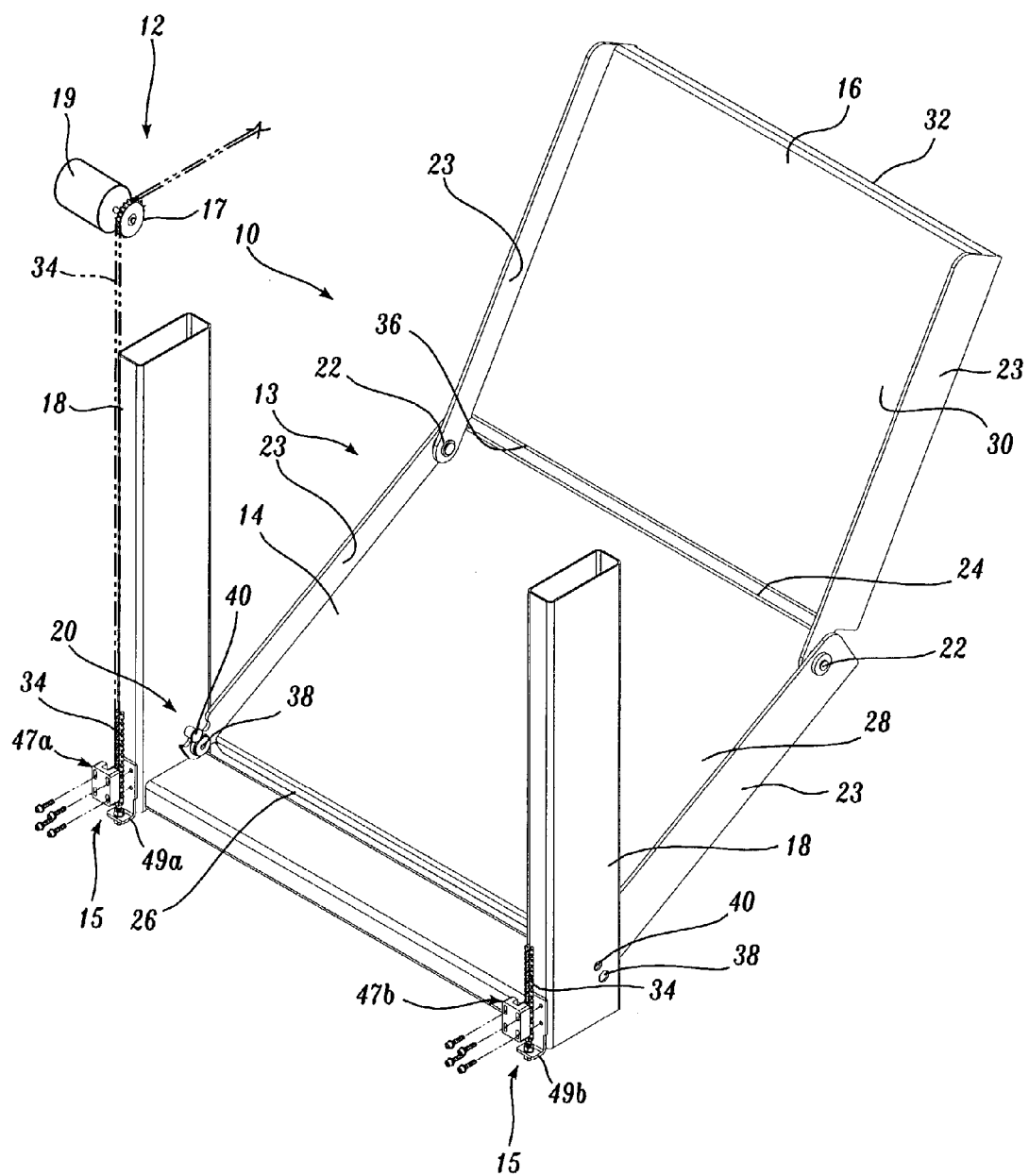
FIG. 1 is a perspective view of a passenger lift formed in accordance with one embodiment of the present invention having a reciprocating assembly and a securing assembly with redundant securing mechanisms for securing the reciprocating assembly to a frame of the passenger lift.

FIG. 1 illustrates one embodiment of a passenger lift 10 having a reciprocating assembly 12 formed in accordance with the present invention. The reciprocating assembly 12 is designed to be used with a passenger lift 10, such as the passenger lift disclosed above in the Background of the Invention section of this application. The reciprocating assembly 12 is secured to a lift platform assembly 13 by a securing assembly 15. The securing assembly 15 includes a pair of locking mechanisms 47a and 47b and a pair of attachment mechanisms 49a and 49b for redundantly coupling the reciprocating assembly 12 to a frame 18 of the passenger lift 10. If one of the locking mechanisms 47 or the attachment assemblies 49 fails, the other of the locking mechanisms 47 or the attachment assemblies 49 provide a continued connection of the reciprocating assembly 12 to the frame 18. The redundant coupling of the reciprocating assembly 12 to the frame 18 impedes any sudden change in the inclination or elevation of the lift platform assembly 13 in the event of a failure of a component of the locking mechanisms 47 or the attachment assemblies 49, thus aiding in preventing injury to a passenger of the passenger lift 10 and those in the vicinity of the lift 10.

The reciprocating assembly 12 is adapted to couple to the lift platform assembly 13 of the passenger lift 10, and is actuatable to reciprocate the lift platform assembly 13 between a raised position and a lowered position. The reciprocating assembly 12 includes a driven member 17, such as a sprocket, attached to a drive source 19, such as motor. A force transmission member, defined as a member adapted to transmit an actuating force generated by the drive source 19 to a frame 18 of the passenger lift for reciprocating the passenger lift between the raised and lowered positions, extends between the driven member 17 and the frame 18. The force transmission member is preferably an elongate flexible member, shown in the illustrated embodiment as a drive chain 34. Although the force transmission member is illustrated as a drive chain 34, other types of load bearing members, such as cables, belts, straps, rods, etc. are also within the scope of the present invention. When the driven member 17 is actuated by the drive source 19, the force transmission member transfers the force generated by the drive source 19 to the lift platform assembly 13 to reciprocate the lift platform assembly 13 between the raised and lowered positions.

For clarity, the vehicle to which the passenger lift 10 may be installed within has not been illustrated. Still further, although the reciprocating assembly 12 and securing assembly 15 are discussed in relation to its use with a passenger lift 10 mounted in a motor vehicle, it is apparent to one skilled in the art that this is done for illustrative purposes and is not limiting. For example, it is apparent to one skilled in the art that the reciprocating assembly 12 and securing assembly 15 are equally applicable to any type of lift, including cargo lifts, and passenger lifts mounted in locations other than in a vehicle, such as a stairway. Still further yet, although illustrative terms, such as vertical, horizontal, left, and right are used, they are descriptive in nature and not limiting.

Inasmuch as the operation of the passenger lift 10 aids in the understanding of the securing assembly 15, the operation of the passenger lift 10 will now be described. The passenger lift 10 includes a vertical reciprocating lift platform assembly 13 that is selectively actuatable between at least a raised and a lowered position. In the lowered position, the lift platform assembly 13 is located adjacent a curbside or loading platform. In this position, a mobility impaired person may exit or enter onto the lift platform assembly 13. In the raised position, the lift platform assembly 13 is substantially level with a floor of a vehicle (not shown), to permit the passage of the mobility impaired individual through an entryway of the motor vehicle and into its interior.

Still referring to FIG. 1, the passenger lift 10 includes the reciprocating assembly 12, the securing assembly 15, the lift platform assembly 13, which further consists of an inboard platform 14 and an outboard platform 16, two vertical support members 18, and two pairs of pin assemblies 20 and 22. The vertical support members 18 are in turn slidably fastened to a support structure, such as the chassis or door frame, at the entryway of the motor vehicle, as is well know in the art.

Referring now to FIGS. 1 and 2, the outboard platform 16 is hingedly attached to the inboard platform 14 by a pair of pin assemblies 22. Each of the pin assemblies 22 has a pivot pin 92 that horizontally extends through the side walls 23 of the inboard and outboard platforms 14 and 16, pivotally joining the two platforms 14 and 16. The pin assemblies 22 are located on opposite sides of the inboard platform 14 at the distal ends of the seam defined by the abutting edges of the inboard platform 14 and the outboard platform 16.

The inboard edge 26 of the inboard platform 14 is hingedly attached to the two vertical support members 18 by a second pair of pin assemblies 20 (one shown). Each of the pin assemblies 20 has a pivot pin 38 that horizontally extends through the sidewall 23 of the inboard platform 14 and the vertical support member 18, pivotally joining the inboard platform 14 to the vertical support member 18. The vertical support members 18 may be selectively raised and lowered to convey the attached lift platform assembly 13 between the raised and lowered positions.

Referring now to FIGS. 1 and 3, the pin assemblies 20 and 22 allow the lift platform assembly 13 to be rotatably deployed from a stowed position to an extended position. To deploy the lift platform assembly 13 to the extended position, the inboard platform 14 is rotated from its vertical stowed position to a horizontal position on the pair of pin assemblies 20. Each of the pin assemblies 20 include the pivot pin 38, a rotation limiting pin 40, and an inboard platform arm 46 having an inboard limiting pin recess 42 and an outboard limiting pin recess 44.

When the inboard platform 14 is rotated to the extended position, the inboard platform 14 rotates about pivot pin 38. Rotation continues until the rotation limiting pin 40 contacts the inboard limit pin recess 42 on the inboard platform arm 46. In this position, the upper planar surface 28 of the inboard platform 14 is oriented in a substantially horizontal position and is maintained in a substantially horizontal position through contact of the rotation limiting pin 40 with the inboard limit pin recess 42. It should be apparent that the phrase "substantially horizontal position" includes the normal operating range of a passenger lift within the scope of this disclosure. At this stage, the outboard platform 16 has yet to be extended and remains folded, resting upon the inboard platform 14.

Referring now to FIGS. 1 and 2, in continuing the deployment of the lift platform assembly 13, the outboard platform 16 is rotated on the pin assemblies 22, outward from the inboard platform 14 until the outboard edge 24 of the inboard platform 14 contacts the inboard edge 36 of the outboard platform 16, limiting the further rotation of the outboard platform 16. Once in the extended position as described, the lift platform assembly 13 may be lowered to the ground or sidewalk to allow a mobility impaired passenger to board the lift platform assembly 13. Two drive chains 34 of the reciprocating assembly 12 are actuated to raise the vertical support members 18, and thereby raise the attached lift platform assembly 13. Once in the raised position, the lift platform assembly 13 is level with the floor of the passenger vehicle (not shown). The mobility impaired passenger is then free to enter into the passenger compartment of the vehicle.

Referring to FIGS. 1 and 3, once the passenger has entered the vehicle, the lift platform assembly 13 is then rotatably deployed into the stowed position. This is accomplished by rotating the outboard platform until the upper surface 30 of the outboard platform 16 is parallel with and opposing the upper surface 28 of the inboard platform 14. The inboard platform 14 and outboard platform 16 are rotated about the pin assemblies 20 until rotation results in the limiting pins 40 contacting the outboard limit pin recesses 44 on the inboard platform arms 46. In this position, the inboard platform 14 and outboard platform 16 are secured by means well know in the art, such as by latches, in their stowed position, nested between and substantially parallel with the vertical support members 18.

Referring now to FIG. 1, in light of the above discussion of the components and operation of the passenger lift 10, the components and operation of the securing assembly 15 will now be described. Generally, the securing assembly 15 secures the drive chains 34 of the reciprocating assembly 12 to the vertical support members 18. The reciprocating assembly 12 selectively lowers and raises the drive chains 34, thereby lowering and raising the attached vertical support members 18 and the attached lift platform assembly 13.

Referring now to FIGS. 1 and 4, the securing assembly 15 includes a left and a right locking mechanism 47a and 47b respectively, and a left and right attachment mechanism 49a and 49b respectively. Each locking mechanism 47 includes a chain lock block 50 and a plurality of block securing bolts 52 Each attachment mechanism 49 includes a mounting bracket 48, a chain clevis 54, and two chain clevis adjustment nuts 57. In the illustrated embodiment, the elements of each of the locking mechanisms 47a and 47b and each of the attachment mechanisms 49a and 49b are identical to one another. Where the context permits, reference in the following description to an element of one of the locking mechanism 47 or one of the attachment mechanisms 49 shall be understood as also referring to the corresponding element in the other mechanism.

Referring to FIG. 4, the mounting brackets 48 of the attachment mechanisms 49 are suitably a planar L-shaped member formed from a high strength material, such as steel. The mounting brackets 48 are mounted to the vertical support members 18 and provide means for coupling the distal ends of the drive chains 34 to the vertical support members 18. More specifically, the mounting brackets 48 are suitably formed from a rectangular shaped vertically oriented backing plate 56 joined to a horizontally oriented attachment plate 58, forming the L-shape of the mounting bracket 48. The backing plate 56 has four apertures 60 bored perpendicularly through the backing plate 56 to allow fasteners to be inserted therethrough and into a set of four corresponding apertures in the vertical support member 18, removably coupling the mounting bracket 48 and the chain lock block 50 to the vertical support member 18. The attachment plate 58 has an aperture 68 (see FIG. 7) bored perpendicularly through to allow the insertion of the chain clevis 54 as will be discussed in greater detail below.

Figure 6:
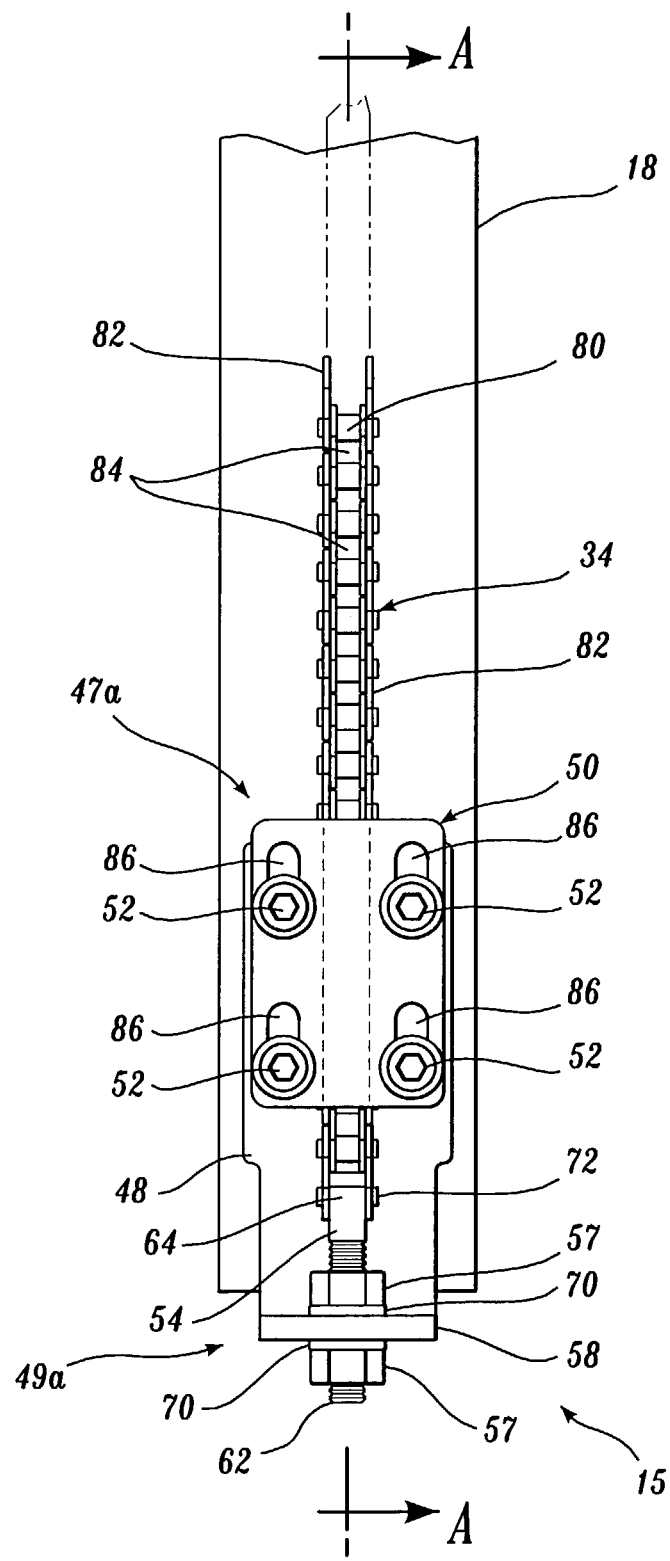
FIG. 6 is a fragmentary elevation planar view of a section of one of the vertical support members of FIG. 1, showing a portion of the reciprocating assembly and securing assembly in greater detail.
Figure 7:
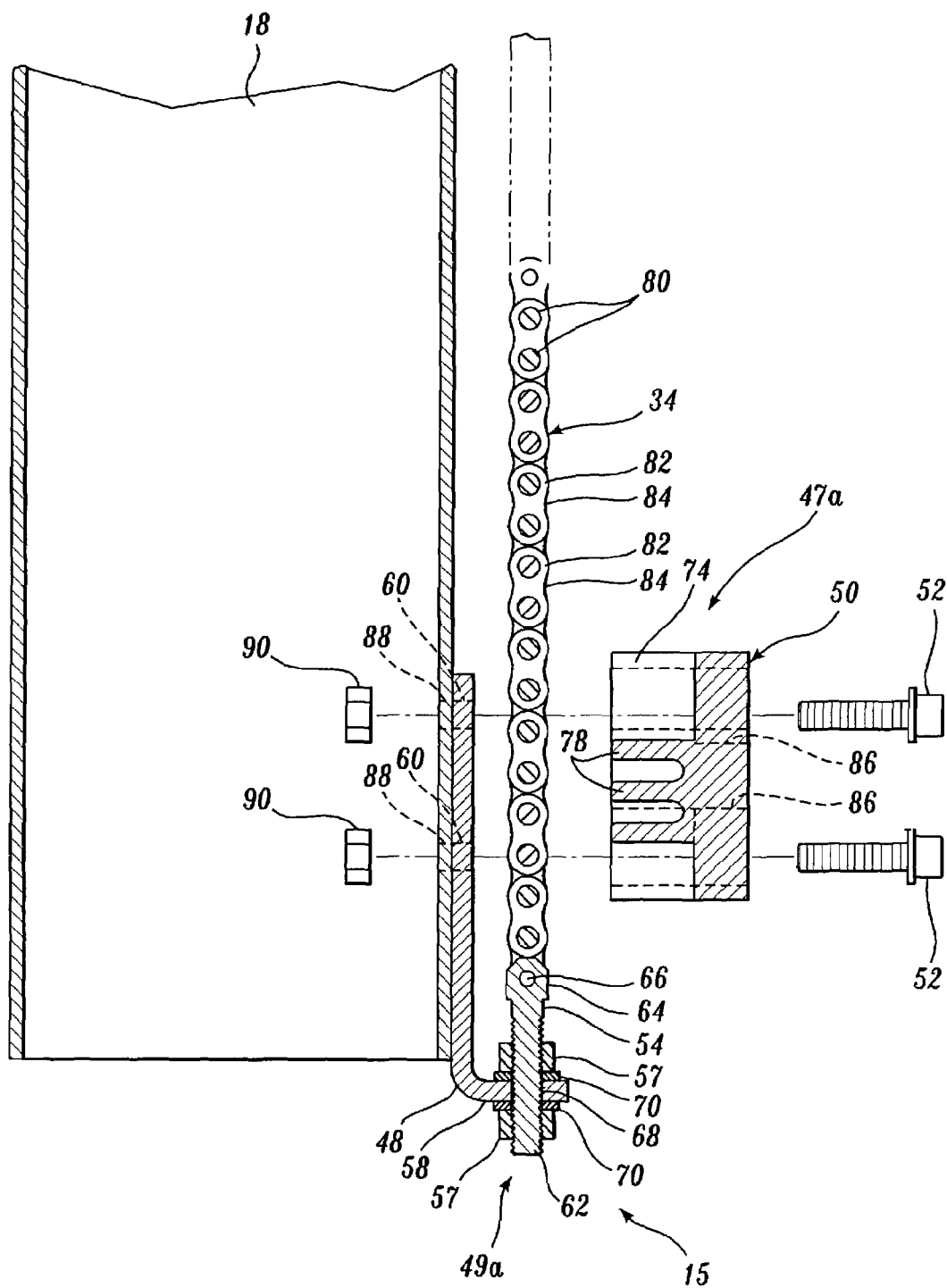
FIG. 7 is a partially exploded fragmentary cross sectional view of a section of one of the vertical support members, a portion of the reciprocating assembly, and securing assembly taken substantially through Section A-A of FIG. 6, showing the chain lock block prior to attachment to the vertical support member.

Referring to FIGS. 6 and 7, the chain clevis 54 is formed from a round bar or shaft, having a threaded lower portion 62 and an upper chain mounting portion 64. The chain mounting portion 64 includes a horizontally oriented bore 66. The distal end of the drive chain 34 is mounted to the bore 66 by insertion of a pin 72 through the chain 34 and the bore 66 in the chain mounting portion 64 of the clevis 54, as is well known in the art. The lower threaded portion 62 of the clevis 54 is inserted through the aperture 68 in the attachment plate 58 and secured through the use of washers 70 and an upper and a lower chain clevis adjusting nut 57.

As is apparent to one skilled in the art, the height of the lift platform assembly 13 may be adjusted by loosening and rotating the adjusting nuts 57 to either raise or lower the mounting bracket 48 in relation to the threaded portion of the clevis 54. Fine adjustment of the height of the lift platform assembly 13 allows the lift platform surface to be manipulated so as to be coplanar with the surface of the vehicle floor when in the raised position. Thereby, when the passenger or mobility device exits the lift platform and into the vehicle, the passenger or mobility device is not presented with any obstacle caused by a difference in the height of the two surfaces. Further, the lift platform assembly 13 can be leveled by individually adjusting either the left or the right clevis 54 independently of the other, to raise or lower one side of the lift platform assembly 13 relative to the other.

The clevis 54 to mounting bracket 48 connections are designed to fully support the passenger lift assembly in operation. However, as a safety precaution, the chain lock blocks 50 provide a secondary means of securing the drive chains 34 to the vertical members 18, thus preserving the integrity of the passenger lift assembly even in event of a clevis 54 or attachment plate 58 failure, as will be discussed in more detail below.

Referring to FIGS. 4, 5 and 7, the chain lock block 50 is a generally rectangular shaped block. Along the center line of the block 50 is a vertically oriented channel 74 dimensioned to accept the length, height and width of the drive chain 34 within its walls. Within the channel 74 are three (3) locking tines 78 that extend horizontally outward from the centerline of the channel 74. The tines 78 are dimensioned and spaced to be removably insertable within locking bores or openings 84 in the drive chain 34, where the periphery of the openings 84 are defined vertically by the rollers 80 and horizontally by the side links 82 of the drive chain 34.

The chain lock block 50 has four (4) oblong apertures 86 bored horizontally through the block 50. The apertures 86 are located at each of the four (4) corners of the block 50, with the length of the oblong apertures 86 oriented vertically. The apertures 86 are sized and dimensioned to accept the block securing bolts 52. The vertical length of the oblong apertures 86 allows the chain lock block 50 to slide along its vertical axis. This is preferably accomplished by loosening, but not removing the block securing bolts 52. The chain lock block 50 can then be slid vertically, with the path of the chain lock block 50 restricted along the vertical axis by the securing bolts 52 sliding within the vertical length of the oblong apertures 86. The block securing bolts 52 are then re-tightened, resecuring the chain lock block 50 in position.

Figure 8:
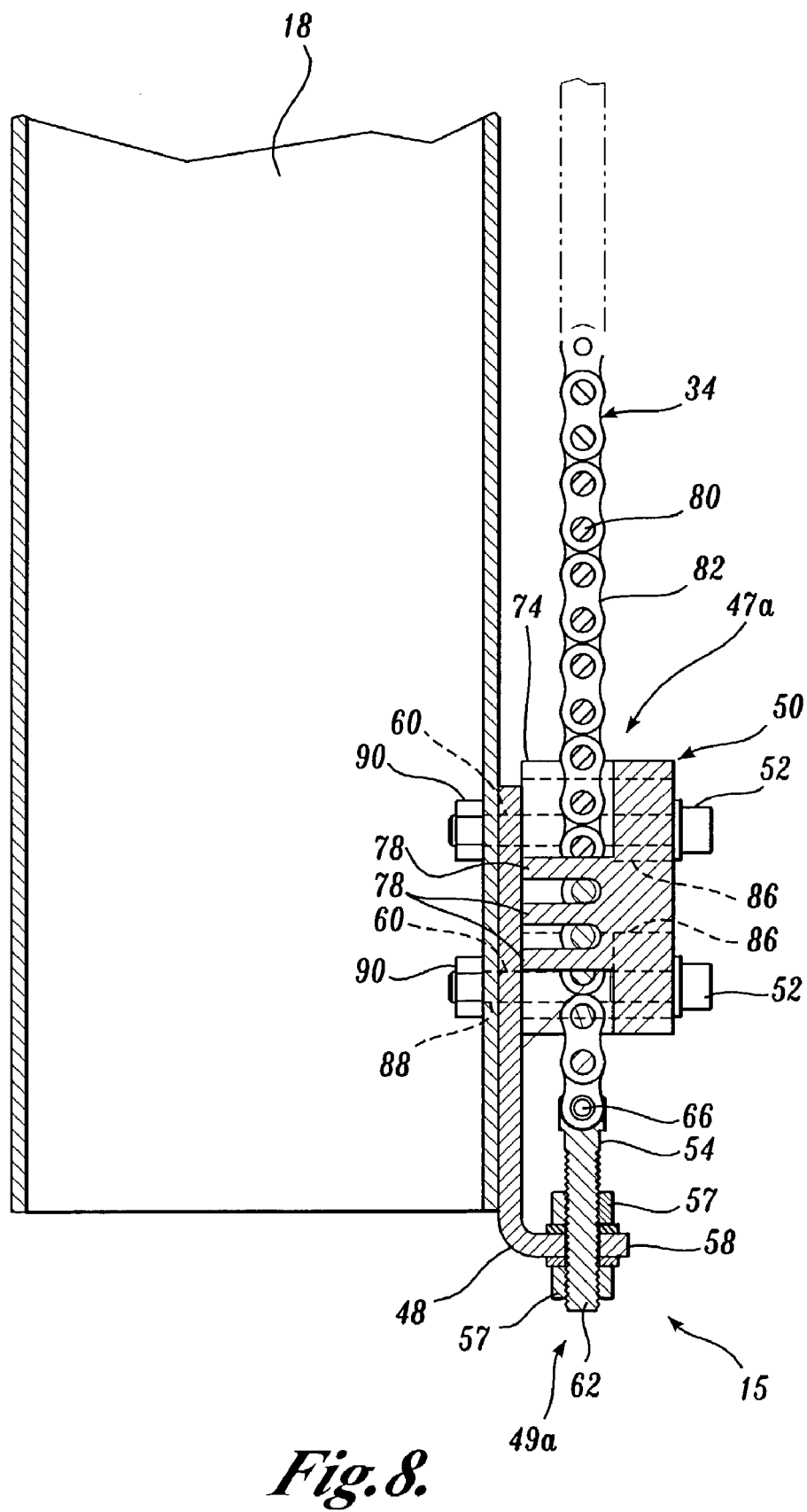
FIG. 8 is an assembled fragmentary cross sectional view of a section of one of the vertical support members formed in accordance with one embodiment of the present invention taken substantially through Section A-A of FIG. 6, showing the chain lock block attached to the vertical support member.

In light of the above description of the components of the securing assembly 15, the operation of the securing assembly 15 will now be described. Referring to FIG. 7, the vertical support members 18 are lifted by an external means, such as a jack as a non-limiting example, until the upper surface of the lift platform assembly is coplanar with vehicle floor and roughly level. The four apertures 88 in the vertical support member are aligned with the four apertures 60 in the mounting bracket 48 as shown in FIG. 7. Referring now to FIG. 8, the chain locking block 50 is positioned so that the drive chain 34 runs vertically through the channel 74 in the block 50, and the locking tines 78 are inserted within the openings of the drive chain 34. The block securing bolts 52 are inserted through the apertures 86, 60 and 88 in the chain lock block 50, mounting bracket 48, and vertical support member 18, respectively, and threaded tightly into a set of standard nuts 90 positioned within the vertical member 18.

Still referring to FIG. 8, at this point, the external lifting means is removed and the lift platform assembly is leveled by adjusting the chain clevis 54. This is accomplished by first loosening, but not removing, the block securing bolts 52. The bolts 52 are loosened until the chain lock block 50 can slide vertically, its movement guided by the securing bolts 52 sliding within the vertical length of the oblong mounting bolt apertures 86 in the block 50. The chain clevis adjustment nuts 57 are selectively engaged on the threaded portion 62 of the clevis to either raise or lower one side of the lift platform assembly, leveling the lift platform assembly or adjusting its height. As the adjusting nuts 57 are selectively rotated to lower threaded portion 62 relative to the mounting bracket 48, for example, thereby lifting one side of the lift platform assembly, the chain lock block 50 slides downward, guided by the securing bolts 52 riding within the vertical length of the oblong mounting bolt apertures 86 in the block 50. Once the lift platform assembly is level and the proper height selected by following the above procedure, the block securing bolts 52 and adjusting nuts 57 are fully tightened, providing a redundant means of securing the drive chain 34 to the vertical member 18.

This secondary means of securing the drive chain 34 adds another level of safety to the passenger lift 10. For example, in the event of a failure (i.e. loss of load bearing capacity) of one of the components of attachment mechanisms 49, for instance failure of one of the chain devises 54, mounting bracket 48, attachment plates 58, or chain clevis adjustment nuts 57, the lift platform assembly is maintained in a level position by the chain lock block 50 of the locking mechanism 47. More specifically, the drive chain 34 will remain securely mounted to the vertical support member 18 by the engagement of the locking tines 78 within the openings of the drive chain 34. On the other hand, if the chain lock block 50 were to fail, for example by the severing of the locking tines 78, the lift platform assembly would be maintained in a level position by the drive chain's 34 connection to the mounting bracket 48 through the chain clevis 54. Therefore, it is apparent to one skilled in the art that the security assembly 15 provides redundant means of support to the lift platform assembly while maintaining its ability to provide a platform leveling and height adjustment means.

Although each of the foregoing embodiments has been described, it should be apparent that variations of embodiments are also contemplated and, therefore, are within the scope of the present invention. As a non-limiting example, the chain lock block may be fastened directly to the vertical support member 18, and not to the mounting bracket 48 as illustrated, thereby providing a redundant means of support in the event the mounting bracket securing bolts 52 fail.

Although terminology such as vertical, horizontal, right, and left were used in describing the illustrated embodiment of the present invention for clarity, it should be apparent to those skilled in the art that these terms are descriptive, and not limiting.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A wheelchair lift for a vehicle, the wheelchair lift comprising:
   (a) a lift platform coupled to a frame;
   (b) a reciprocating assembly having a force transmission member in communication with the lift platform to reciprocate the lift platform between a raised and a lowered position;
   (c) a locking mechanism coupling the force transmission member to the frame; and
   (d) an attachment assembly coupling the force transmission member to the frame, wherein if either the locking mechanism or the attachment assembly fails, the other of the locking mechanism or the attachment assembly provides a continued connection of the force transmission member to the frame wherein the force transmission member further includes an aperture, wherein the locking mechanism includes a projection adapted to be received by the aperture, wherein the force transmission member further includes an aperture, wherein the locking mechanism includes a projection adapted to be received by the aperture.

2. The wheelchair lift of claim 1, wherein the attachment assembly is adjustable such that the force transmission member is adjustably coupled to the frame.

3. The wheelchair lift of claim 1, wherein the locking mechanism further comprises a body and a channel extending through the body, and wherein the channel is sized to lockingly receive at least a portion of the force transmission member.

4. The wheelchair lift of claim 1, wherein the force transmission member further includes a plurality of apertures, and wherein the locking mechanism comprises a plurality of projections, each one of the plurality of projection sized to be received within a corresponding one of the plurality of apertures of the force transmission member.

5. The wheelchair lift of claim 1, wherein the locking mechanism is adjustable to selectively couple the locking mechanism to the frame at one of a first location or a second location.

6. The wheelchair lift of claim 1, wherein the locking mechanism couples the force transmission member at a first location to the frame, and wherein the attachment assembly simultaneously couples the force transmission member at a second location to the frame.

7. A wheelchair lift for a vehicle, the wheelchair lift comprising:
   (a) a lift platform coupled to a frame;
   (b) a reciprocating assembly having a force transmission member in communication with the lift platform to reciprocate the lift platform between a raised position and a lowered position; and
   (c) means for lockingly coupling a portion of the force transmission member to the frame, the means for lockingly coupling comprising:
      (i) a first coupling means for coupling the force transmission member in communication with the lift platform; and
      (ii) a second coupling means for coupling the force transmission member in communication with the lift platform, wherein the first and second coupling means provide redundant coupling of the force transmission member to the frame, where the first coupling means comprises:
      (iii) a body;
      (iv) a channel disposed through the body, the channel sized to receive at least a portion of the force transmission member; and
      (v) at least one projection disposed in the channel, the projection sized to be received within an aperture of the force transmission member.

8. The wheelchair lift of claim 7, wherein the first coupling means is adjustable such that the first coupling means may be selectively coupled to the frame at a first location or a second location.

9. The wheelchair lift of claim 7, wherein the second coupling means is adjustable such that the force transmission member of the reciprocating assembly is adjustably coupled to the frame.

10. The wheelchair lift of claim 7, wherein the force transmission member of the reciprocating assembly includes a chain, wherein the chain is engaged by the first and second coupling means.

11. The wheelchair lift of claim 7, wherein the force transmission member of the reciprocating assembly further comprises two or more apertures, and wherein the first coupling means comprises two or more projections, each projection sized to be received within an aperture of the force transmission member of the reciprocating assembly.

12. A wheelchair lift for a vehicle, the wheelchair lift comprising:
   (a) a lift platform coupled to a frame;
   (b) a reciprocating assembly having a force transmission member in communication with the lift platform to reciprocate the lift platform between a raised and a lowered position;
   (c) a locking mechanism coupling the force transmission member to the frame; and
   (d) an attachment assembly coupling the force transmission member to the frame, wherein if either the locking mechanism or the attachment assembly fails, the other of the locking mechanism or the attachment assembly provides a continued connection of the force transmission member to the frame, wherein the force transmission member further includes a plurality of apertures, and wherein the locking mechanism comprises a plurality of projections, each one of the plurality of projection sized to be received within a corresponding one of the plurality of apertures of the force transmission member.

13. A wheelchair lift for a vehicle, the wheelchair lift comprising:
   (a) a lift platform coupled to a frame;
   (b) a reciprocating assembly having a force transmission member in communication with the lift platform to reciprocate the lift platform between a raised position and a lowered position; and
   (c) means for lockingly coupling a portion of the force transmission member to the frame, the means for lockingly coupling comprising:

(i) a first coupling means for coupling the force transmission member in communication with the lift platform; and
(ii) a second coupling means for coupling the force transmission member in communication with the lift platform, wherein the first and second coupling means provide redundant coupling of the force transmission member to the frame, wherein the force transmission member of the reciprocating assembly further comprises two or more apertures, and wherein the first coupling means comprises two or more projections, each projection sized to be received within an aperture of the force transmission member of the reciprocating assembly.

* * * * *